July 13, 1954 G. C. SHINN ET AL 2,683,611
CONVERTIBLE TRAILER
Filed Oct. 21, 1952 4 Sheets-Sheet 1
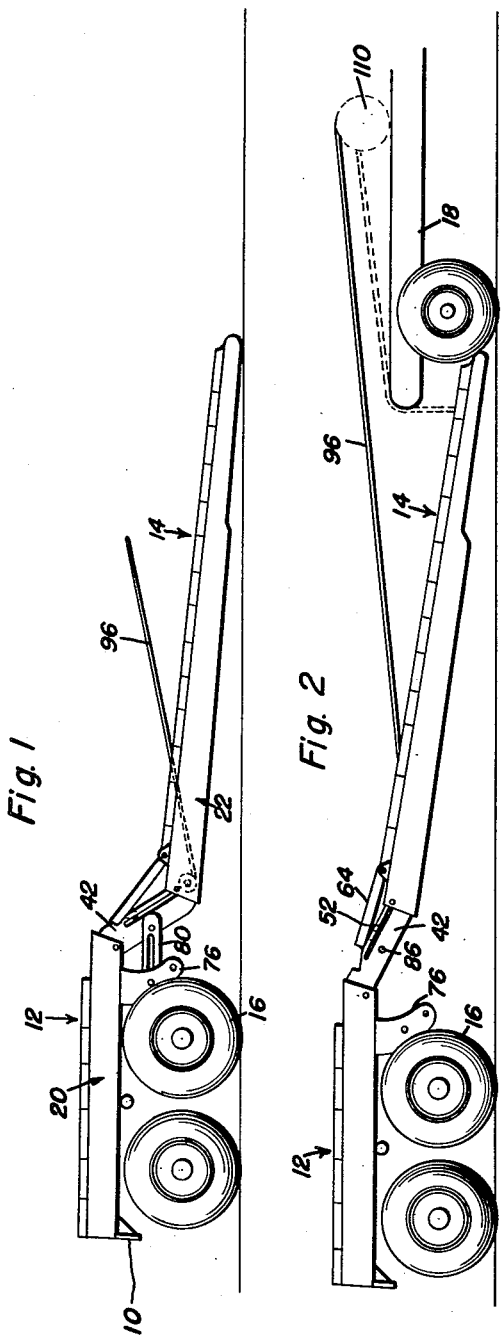
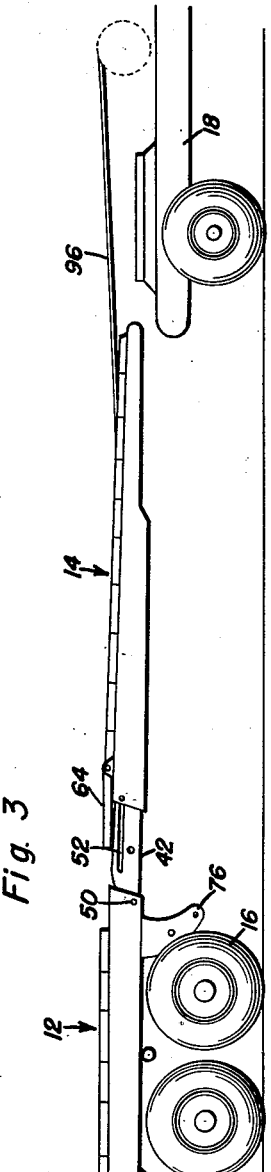
Guy C. Shinn
Claud T. Gautier
INVENTORS July 13, 1954

G. C. SHINN ET AL 2,683,611

CONVERTIBLE TRAILER

Filed Oct. 21, 1952

Guy C. Shinn
Claud T. Gautier
INVENTORS

BY *[signatures]*
Attorneys

July 13, 1954

G. C. SHINN ET AL 2,683,611

CONVERTIBLE TRAILER

Filed Oct. 21, 1952

Guy C. Shinn
Claud T. Gautier
INVENTORS

BY *Clarence A. O'Brien*
*and Harvey B. Jackson*
Attorneys

July 13, 1954  G. C. SHINN ET AL  2,683,611
CONVERTIBLE TRAILER

Filed Oct. 21, 1952  4 Sheets-Sheet 4

Guy C. Shinn
Claud T. Gautier
INVENTORS

Patented July 13, 1954

2,683,611

UNITED STATES PATENT OFFICE 2,683,611

CONVERTIBLE TRAILER

Guy C. Shinn and Claud T. Gautier,
Hamilton, Tex.

Application October 21, 1952, Serial No. 315,908

5 Claims. (Cl. 280—44)

This invention relates to a convertible trailer and particularly to an articulation for making a low bed trailer or a high bed trailer out of the same convertible frame.

In construction work and other heavy duty hauling, it is frequently desirable to have a type of trailer having a low bed on which heavy equipment may be readily mounted and moved about. However, it frequently happens that this low bed trailer is of relatively intermittent use and that therebetween there is a use for a high bed or platform-type of trailer. The present invention provides a convertible trailer which may be used at will either as a low bed trailer or as a platform-type trailer.

This is made possible by means of a transverse articulation so arranged that a portion of the bed may be lowered with respect to another portion of the bed and locked in a trailing position therewith. The articulation may also be locked in the elevated position so that the entire device may be used as a platform or high bed trailer as is desired.

The articulation according to the present invention provides a hinge member or articulating plate which is mounted in pivotal relation between the ends of a discontinuous longitudinally extending frame member and being pivoted into locking relation with respect to the frame members with one of the frame members being longitudinally slidably along the plate so that the longitudinal beam sections may be either at offset or in abutting relation and may be locked rigidly in such position.

It is accordingly an object of the invention to provide an improved trailer.

A further object of the invention is to provide a trailer which may be utilized in either the flat bed or low bed condition as is desired.

It is a further object of the invention to provide an improved articulation between the portions of the trailer.

A further object of the invention is to provide an articulation which may be locked in either low or high position as is desired.

Other objects and many of the attendant advantages of the invention will be apparent from the following detailed description taken in conjunction with the accompanying drawing in which:

Figure 1 is a side elevation of the convertible trailer in the low bed position and disconnected from a tractor;

Figure 2 is a side elevation in a first intermediate lifting stage from low bed to platform trailer;

Figure 3 is a side elevation in a second intermediate stage with the platform lifted but with the articulation extended;

Figure 4:
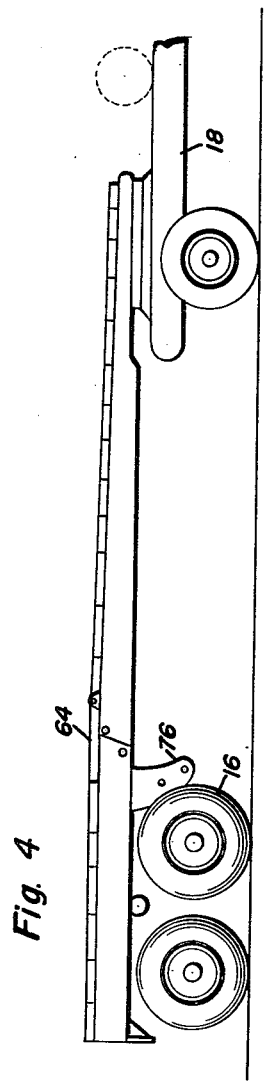
Figure 4 is a side elevation of the convertible trailer in full platform position and mounted to a tractor.
Figure 5:
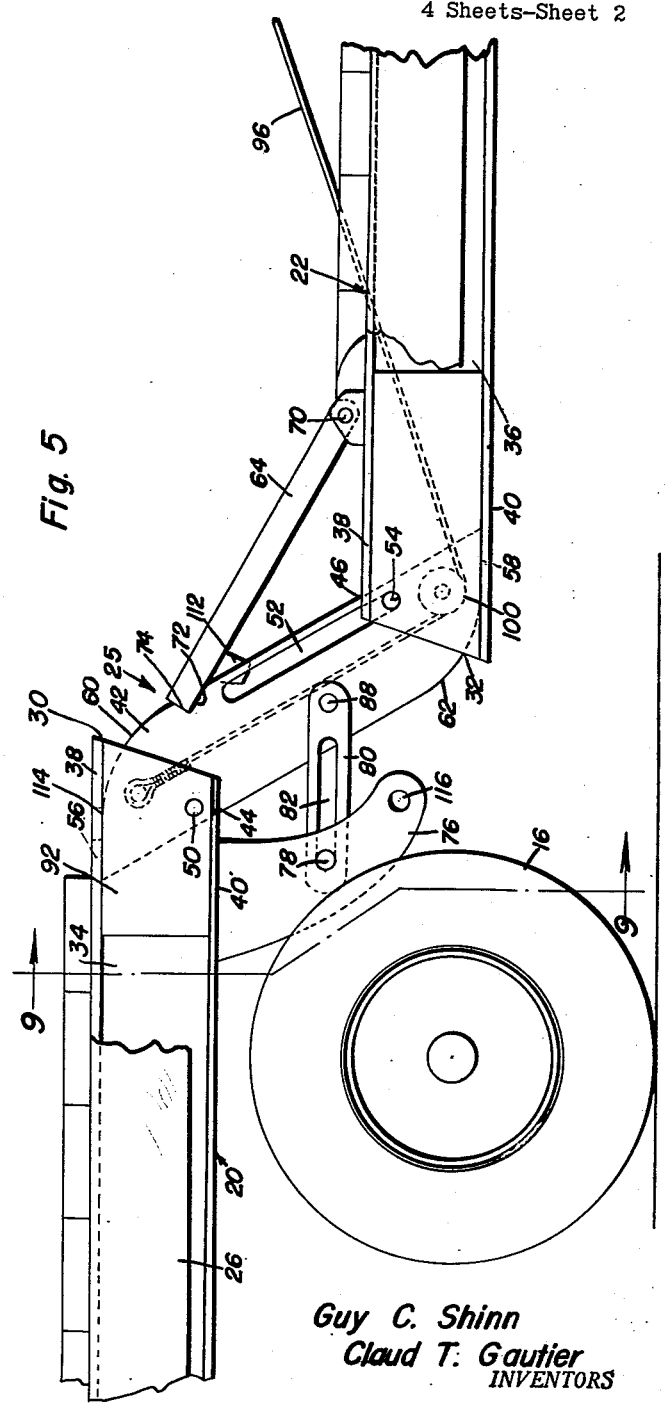
Figure 5 is an enlarged elevation, with parts broken away, of the articulation locked in low bed position.
Figure 6:
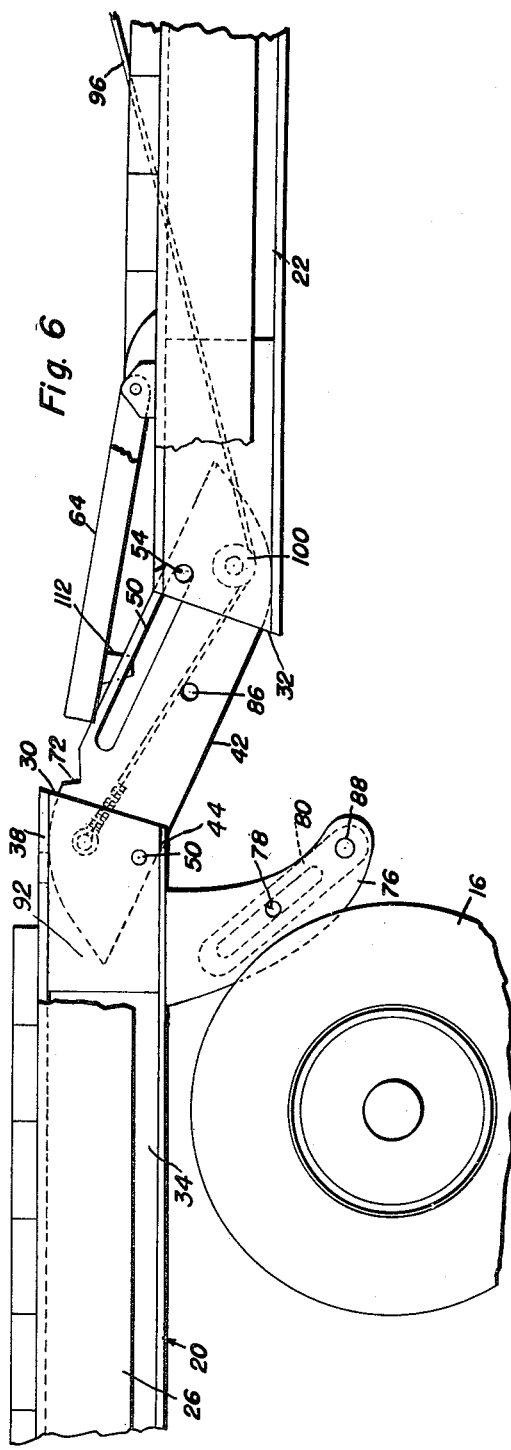
Figure 6 is an enlarged elevation of the articulation substantially as shown in Figure 2.
Figure 7:
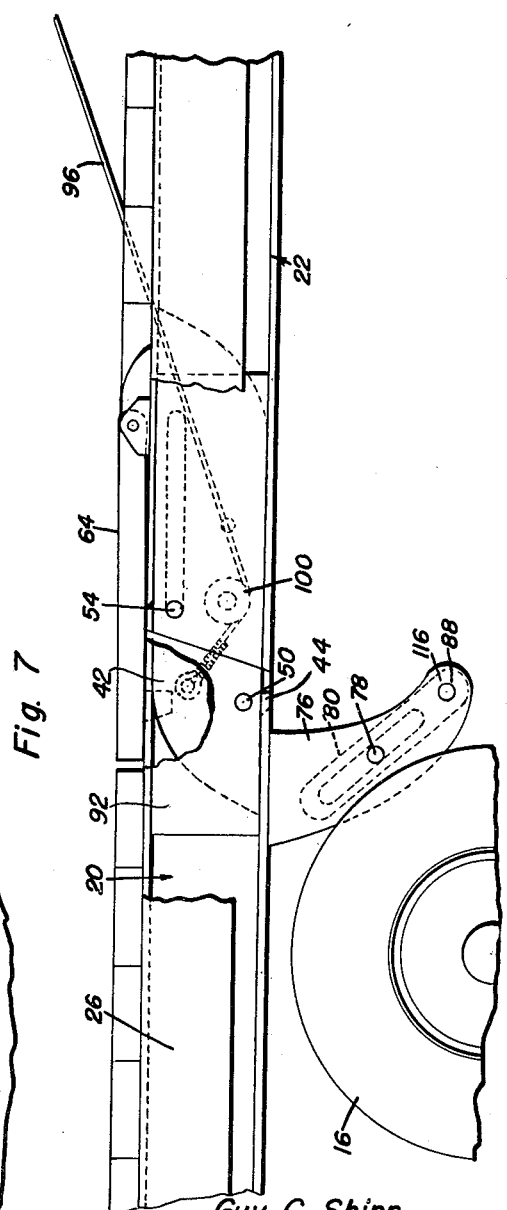
Figure 7 is an enlarged elevation, with parts broken away, showing the articulation in locked platform position.
Figure 8:
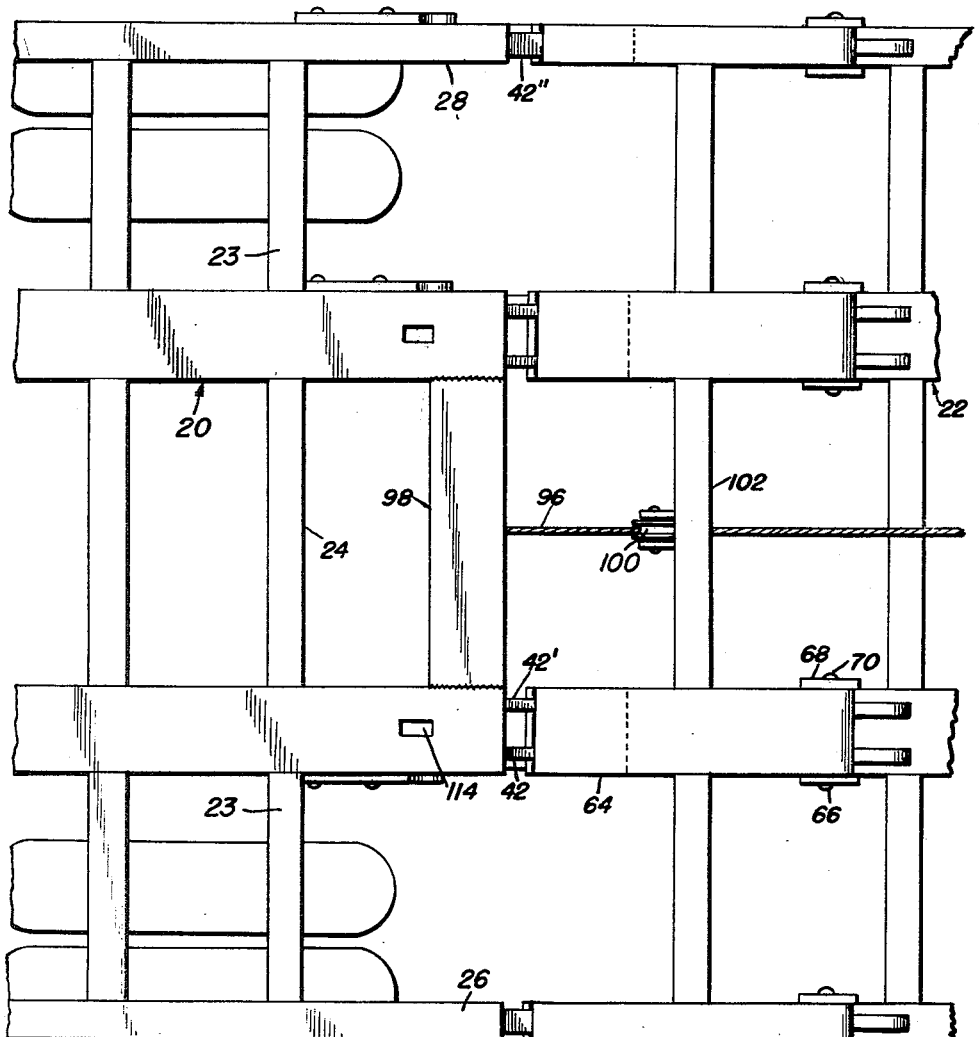
Figure 8 is an enlarged top plan view of the articulation locked in low bed position.
Figure 9:
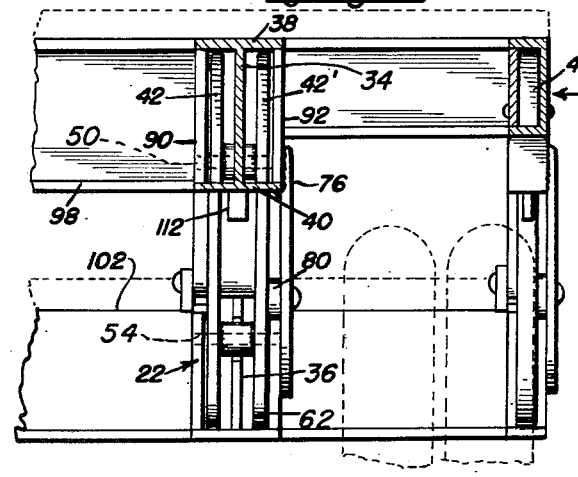
Figure 9 is an enlarged partial section through the trailer showing the articulation in locked low bed position, taken substantially on the plane indicated by the line 9—9 of Figure 5.

In an exemplary embodiment, the convertible trailer 10 is provided with a substantially constantly elevated rear section 12 and a front platform section 14 which may be readily mounted in either the lowered or high position as is desired. The rear section 12 is mounted on suitable wheels 16 while the forward section 14 is adapted to be connected to a tractor 18 for hauling the trailer in any desired position.

Sections 12 and 14 are supported on longitudinal beams having rear sections 20 and forward sections 22 connected together by means of transverse body members 24. The body members 24 are preferably welded between the beam sections 20 or the beam sections 22 and similar transverse beams 23 extend laterally beyond the beams in the central portion of the machine to laterally disposed side rails such as 26 and 28. The rear section 20 and the forward section 22 of each of the longitudinally extending central beams are connected together by means of articulations 25 and constitute an articulated longitudinally extending frame member.

Preferably the central beams of the device such as 20 and 22 are constituted as H-beam sections while the lateral side rails 26 are constituted as channel members. Also, the channel members forming the side rails are likewise provided with articulations similar to the articulations 25 in the central beams.

Since the central beams are substantially identical and the articulations on all of the beams are substantially identical, a single articulation will be completely described, it being understood that any slight modification necessary may be made between the articulation in the central beams and in the side beams.

Each of the sections 20 and 22 is preferably provided with an oblique surface 30 and 32 respectively to provide a substantially straight frame member when the sections 20 and 22 are abutted. Each of the frame sections 20 and 22 is provided with a web portion 34 or 36 respectively and has laterally extending flange members 38 and 40. Articulation plate members 42 are provided of a sufficient width to readily slide between the flanges 38 and 40 of either the beam sections 20 or 22 as the case may be. The laterally extending flange 40 on the lower edge of the rear section of the beam 20 is cut away adjacent the forward edge thereof to provide a recess 44 for a purpose presently to be described. Likewise, the upper beam flange 38 of the forward beam section 22 is cut away adjacent the upper side to provide a cut-away section 46. The articulation plate member 42 is pivotally connected adjacent the lower front end of the rear beam section 20 by means of a pivot pin 50. The plate 42 is provided with a longitudinally extending pivot slot 52 adjacent the forward upper edge thereof. The pivot pin 54 in the web 36 extends through the slot 52 to provide the forward beam section 22 in pivoted sliding relation with the articulation plate 42. Plate 42 is provided with oblique ends 56 and 58 which are substantially parallel in relation to each other and oblique to the center line of the plate 42. An arcuate portion 60 extends between the top of the plate 42 and the oblique bearing surface 56 so that the plate 42 may readily pivot about the pivot pin 50 to bring the bearing surface 56 into bearing relation with the extending flange 38. Likewise, an arcuate surface 62 extends between the bottom of the articulating plate 42 and the bearing surface 58 so that the bearing surface 58 may be brought into bearing relation with the lower extending flange 40 of the forward beam section 22. The surfaces 56 and 58 thereby tend to limit the downward motion of the articulation plate 42 to help support any load mounted on the forward section 14 of the convertible trailer. A latching plate 64 is mounted between the ears 66 and 68 by means of a pivot pin 70. The latching plate 64 is of sufficient length to extend rearwardly beyond the end 32 of the forward section 22 and the articulating plate 42 is provided with a notch 72 so that the end 74 of the latch plate 64 may engage in the notch and maintain the weight to prevent excessive pressures on the surfaces 56 and 58.

In order to provide tractive effort between the forward and rear section without uncoupling the plate 42, a bracket 76 is secured in depending relation to the rear section 20 of the longitudinal beam and a pivot pin 78 is mounted thereon. An arm 80 having a longitudinally extending slot 82 is pivotally and slidably secured on the pivot pin 78. The articulating arm member 42 is provided with an aperture 86 while the arm 80 is provided with a pin 88 adapted to engage in the aperture so that when the arm 80 is engaged with the pin 78 and engaged in the aperture 86, the articulation plate member 42 is rigidly locked with angular relation to the beam sections 20 and 22 so that traction effort may be extended through the arm 80 to cause the rearward section of the trailer to move forward when tension is applied to the forward section 14.

The longitudinal frame sections 20 and 22 are preferably H-beams and the articulation plates 42 are preferably provided in pairs such as plates 42 and 42'. The side rails 26 and 28 will preferably be simply channel-shaped members and will have a single articulation plate 42''. Cover plates 90 and 92 are preferably applied to the outer faces of the laterally extending flanges 38 and 40 of the H-beams constituting the rear frame sections 20 to provide substantial enclosures in which the articulating plates 42, 42' and 42'' may readily extend.

In order to control the articulation members and convert the trailer at will, a flexible tension member 96 is mounted to a cross-strip 98 between the forward ends of the rear beam members 20 and extends under a sheave 100 mounted on a transverse member 102 of the forward beam section 22. Tension member 96 may extend to any suitable device such as a drum 110 on the tractor device 18 and the drum 110 may apply a tension to the member 96 to lift or lower the forward section 14 with respect to the rear section 12 as may be desired. In order to provide proper drawing tension between the forward section 14 and the rear section 12 when the trailer is in high bed position, a detent 112 is provided on the latch plate 64 and a receiving aperture 114 is provided in the top surface of the beam section 20.

In the operation of the convertible trailer according to the invention, assuming that the section 14 is in lowered position as shown in Figure 1, in order to move to the full bed position shown in Figure 4, the arm 80 would be disengaged from the plate 42 and preferably locked into an auxiliary recess 116 in the bracket 76. The latch plate 64 would then be raised, lifting the end 74 out of the notch 72 so that when tension is applied to the member 96 the plates 42 will be moved to an angular relation substantially in line with the members 20 and 22. Continuation of the pressure will bring the members 20 and 22 into alignment at which time the pivot pins 54 will slide in the slots 52 until the ends 30 and 32 come into abutment, at which time the finger 112 will drop into the retainer 114 and lock the sections 20 and 22 in substantially firm relation. A telescopic movement of the member 42 between the flanges 38 and 40 of the forward beam sections 22 will provide a load bearing stiffness between the sections.

Likewise, when it is desired to move from a flat bed position to the low bed position, the detent 112 will be removed from the aperture 114 and the forward section moved forward until the weight thereof causes a lowering or sliding motion of the pin 54 in the slot 52 until the bearing surfaces 56 and 58 come into play and the end 74 drops into the notch 72. The arm 80 will then be locked into position so that the articulation has rigidified in both directions and pressure either in a forward or backward direction may be applied to the front section 14 preferably through means of a gooseneck (not shown) for drawing or backing the trailer as may be desired.

While for purposes of exemplification a particular embodiment of this invention has been shown, and described according to the best present understanding thereof, it will be apparent that changes and modifications may be made in the construction and arrangement of the parts thereof without departing from the true spirit of the invention.

What is claimed as new is as follows:

1. In a convertible trailer having a wheel supported rear section and an adjustable forward section, a construction comprising discontinuous longitudinal beams, said beams each including a vertically disposed web portion and parallel laterally disposed flange portions, an articulating plate member extending across the discontinuity of said beam, said plate member fitting between said flanges, said plate being pivotally secured adjacent the lower forward end of the rear section of said beam, said plate being pivotally and slidably secured adjacent the top rear of the forward section of the beam, said sliding connection permitting telescoping of said plate between the flanges of said beam, the ends of said plate being cut obliquely providing a bearing surface for engagement with the flange of said beam section there being an arcuate portion between the top of the plate and the rear oblique surface and an arcuate portion between the bottom edge of the plate and the forward oblique surface, a latching plate pivotally secured to the top of the forward section in spaced proximity to the rear end thereof, said latching plate extending past the rear end of said forward beam section, means for interengaging said latching plate and said plate member.

2. In a convertible trailer having a wheel supported rear section and an adjustable forward section, a construction comprising discontinuous longitudinal beams, said beams each including a vertically disposed web portion and parallel laterally disposed flange portions, an articulating plate member extending across the discontinuity of said beam, said plate member fitting between said flanges, said plate being pivotally secured adjacent the lower forward end of the rear section of said beam, said plate being pivotally and slidably secured adjacent the top rear of the forward section of the beam, said sliding connection permitting telescoping of said plate between the flanges of said beam, the ends of said plate being cut obliquely providing a bearing surface for engagement with the flange of said beam sections there being an arcuate portion between the top of the plate and the rear oblique surface and an arcuate portion between the bottom edge of the plate and the forward oblique surface, a depending bracket adjacent the forward end of the rear beam section, a pivot pin in said bracket, a tension arm, said arm having a longitudinal slot pivotally and slidably mounted on said pin, said plate member having an aperture, a locking pin on said arm engageable in said aperture.

3. In a convertible trailer having a wheel supported rear section and an adjustable forward section, a construction comprising discontinuous longitudinal beams, said beams each including a vertically disposed web portion and parallel laterally disposed flange portions, an articulating plate member extending across the discontinuity of said beam, said plate member fitting between said flanges, said plate being pivotally secured adjacent the lower forward end of the rear section of said beam, said plate being pivotally and slidably secured adjacent the top rear of the forward section of the beam, said sliding connection permitting telescoping of said plate between the flanges of said beam, the ends of said plate being cut obliquely providing a bearing surface for engagement with the flange of said beam section there being an arcuate portion between the top of the plate and the rear oblique surface and an arcuate portion between the bottom edge of the plate and the forward oblique surface, a latching plate pivotally secured to the top of the forward section in spaced proximity to the rear end thereof, said latching plate extending past the rear end of said forward beam section, means for inter-engaging said latching plate and said plate member, the top flange of the forward end of the rear beam section having an aperture therein, a locking finger on said latching plate adapted for engagement in said aperture.

4. In a convertible trailer having a wheel supported rear section and an adjustable forward section, a construction comprising discontinuous longitudinal beams, said beams each including a vertically disposed web portion and parallel laterally disposed flange portions, an articulating plate member extending across the discontinuity of said beam, said plate member fitting between said flanges, said plate being pivotally secured adjacent the lower forward end of the rear section of said beam, said plate being pivotally and slidably secured adjacent the top rear of the forward section of the beam, said sliding connection permitting telescoping of said plate between the flanges of said beam, the ends of said plate being cut obliquely providing a bearing surface for engagement with the flange of said beam section there being an arcuate portion between the top of the plate and the rear oblique surface and an arcuate portion between the bottom edge of the plate and the forward oblique surface, a latching plate pivotally secured to the top of the forward section in spaced proximity to the rear end thereof, said latching plate extending past the rear end of said forward beam section, means for interengaging said latching plate and said plate member, the top flange of the forward end of the rear beam section having an aperture therein, a locking finger on said latching plate adapted for engagement in said aperture, said rear beam and said forward beam sections meeting on an oblique surface.

5. In a convertible trailer having a wheel supported rear section and an adjustable forward section, a construction comprising discontinuous longitudinal beams each including a rear and a forward H-beam section, said beam section each including a vertically disposed web portion and parallel laterally disposed flange portions, an articulating plate member extending across the discontinuity of said beam on each side of said web portions, said plate member fitting between said flange portions, said plate being pivotally secured adjacent the lower forward end of the rear section of said beam, said plate being pivotally and slidably secured adjacent the top rear end of the forward section of the beam, said sliding connection permitting telescoping of said plate between the flanges of said beam, the ends of said plate being cut obliquely providing parallel oblique bearing surfaces for engagement with the flanges of said beam sections there being an arcuate portion between the top edge of the plate and the rear oblique surface and an arcuate portion between the bottom edge of the plate and the forward oblique surface.

References Cited in the file of this patent

UNITED STATES PATENTS

| Number | Name | Date |
|---|---|---|
| 2,153,946 | Linstead et al. | Apr. 11, 1939 |
| 2,431,436 | Townsend | Nov. 25, 1947 |